(12) United States Patent
Shafer et al.

(10) Patent No.: US 7,753,264 B2
(45) Date of Patent: Jul. 13, 2010

(54) AUTOMATED REWARD PROGRAM

(75) Inventors: Don Shafer, Melissa, TX (US); Gabriel Krajicek, Austin, TX (US); Paul Barton, Round Rock, TX (US)

(73) Assignee: BancVue Ltd, Austin, TX (US)

( * ) Notice: Subject to any disclaimer, the term of this patent is extended or adjusted under 35 U.S.C. 154(b) by 0 days.

(21) Appl. No.: 11/553,716

(22) Filed: Oct. 27, 2006

(65) Prior Publication Data
US 2008/0116260 A1    May 22, 2008

(51) Int. Cl.
*G06K 5/00*    (2006.01)

(52) U.S. Cl. .................................. 235/380; 705/14
(58) Field of Classification Search ............ 235/380; 705/14

See application file for complete search history.

(56) References Cited

U.S. PATENT DOCUMENTS

| | | | |
|---|---|---|---|
| 5,732,400 | A | 3/1998 | Mandler |
| 5,774,870 | A * | 6/1998 | Storey ..................... 705/14 |
| 2002/0138343 | A1 * | 9/2002 | Weatherford et al. ......... 705/14 |
| 2003/0093293 | A1 | 5/2003 | Han |
| 2003/0177084 | A1 | 9/2003 | Cassani |
| 2004/0034585 | A1 | 2/2004 | Saunders |
| 2006/0027647 | A1 * | 2/2006 | Deane et al. ................ 235/380 |
| 2007/0181674 | A1 | 8/2007 | Taylor |
| 2008/0120155 | A1 | 5/2008 | Pliha |

OTHER PUBLICATIONS

"Community Foundation for Oak Park," last updated Aug. 13, 2008, www.oakparkfoundation.org.
"Compass Points," Apr. 21, 2008, /www.rewardsnow.com/compass/terms.htm.
"Bellwether Community CU," Apr. 21, 2008, www.bccu.org/interior.php/pid/3/sid/5.
"Juniper Visa Card," Apr. 21, 2008, www.store.apple.com/1-800-MY-APPLE/WebObjects/AppleStore?instantcredit=yes.
"Starbucks card account terms and conditions," May 5, 2008, www.starbucks.com/card/canada_duetto_terms_english.asp.
"iTunes Store Gift Certificates terms and conditions," May 5, 2008, http://www.apple.com/legal/itunes/us/gifts.html.
"Priority Club—The Points of Membership," May 5, 2008, www.ichotelsgroup.com/h/d/pc/1/en/c/2/content/dec/pc/0/en/benefits.html.

(Continued)

*Primary Examiner*—Thien M Le
(74) *Attorney, Agent, or Firm*—Jerry M. Keys; Matheson Keys Garsson & Kordzik PLLC

(57) ABSTRACT

A system and method is provided for operating an automated reward system through a financial institution over a network for merchants that have enrolled in the institution's reward program and for users that have a banking account at the institution associated with the reward program. The system includes a transaction module coupled to the institution for managing enrollment in and processing of purchase information associated with the program. The method includes receiving information at the institution about a first purchase by an enrolled user at an enrolled merchant; determining if the first purchase and the user qualified for such merchant's reward program; assigning monetary credit to the user's account in connection with such first purchase which may be applied towards a future purchase by the user at the enrolled merchant; receiving information at the institution about a second purchase by the user at the enrolled merchant; and applying the previous credit toward payment of the second purchase.

19 Claims, 1 Drawing Sheet

OTHER PUBLICATIONS

Figure 1:
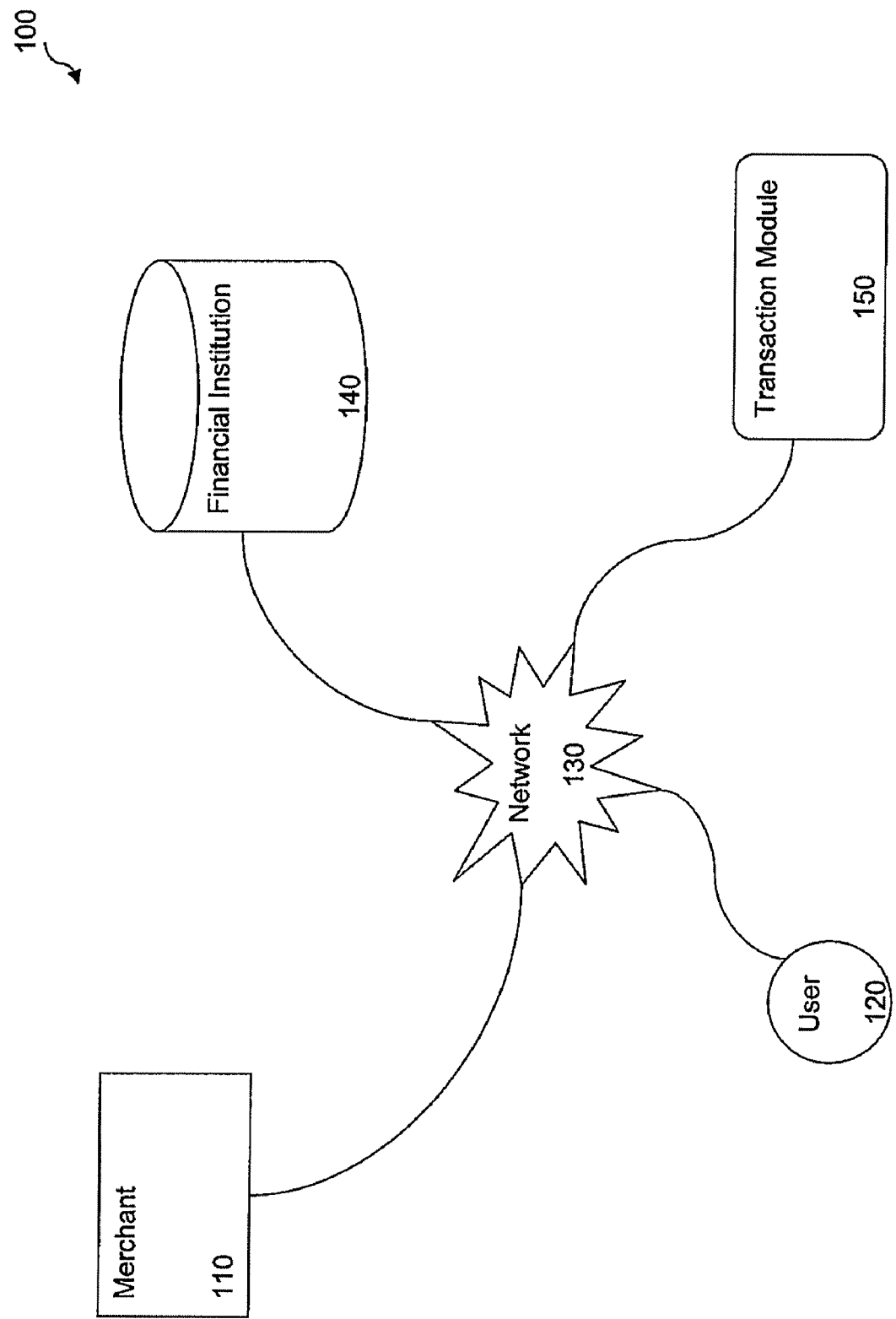

"Priority Club—Partners," May 5, 2008, www.ichotelsgroup.com/h/d/pc/1/en/c/2/content/dec/pc/0/en/partners/us.html.

"Priority Club—Earn Points/Miles," May 5, 2008, www.ichotelsgroup.com/h/d/pc/1/en/c/2/content/dec/pc/0/en/miles/us.html.

"Priority Club—Redeem Points," May 5, 2008, www.ichotelsgroup.com/h/d/pc/1/en/c/2/content/dec/pc/0/en/points/us.html.

"Priority Club—Brand Merchandise," May 5, 2008, www.ichotelsgroup.com/h/d/pc/1/en/c/2/content/dec/pc/0/en/points/us/bm.html.

"City National Bank Free Reward Checking," Nov. 5, 2007, www.cnbt.com/free-reward-checking-p-4.html.

"BancVue—The Solution," Nov. 5, 2007, www.bancvue.com/tour/solution.htm.

"Free Tunes Checking from Oregon Community Credit Union," Nov. 5, 2007,www.freetuneschecking.com.

"Free Tunes Checking Details," Nov. 5, 2007, www.freetuneschecking.com/details.php.

"Free Tunes Checking Requirements," Nov. 5, 2007, www.freetuneschecking.com/requirements.php.

"Free Tunes Checking Locations," Nov. 5, 2007, www.freetuneschecking.com/locations.php.

"Free Tunes Checking Terms," Nov. 5, 2007, www.freetuneschecking.com/terms.php.

"Wikipidia—Stored-Value Card," Nov. 6, 2007, http://en.wikipedia.org/wiki/Stored-value_card.

"Tuned-In Checking," Apr. 17, 2008, http://www.tunedinchecking.com/tune-in/tuned-in-checking-rewards.html.

"Tuned-In Checking," Apr. 17, 2008, http://www.tunedinchecking.com/tune-in/tuned-in-checking-requirements.html.

"Citibank iTunes Rewards," Apr. 21, 2008, http://www.citibank.co.uk/personal/cards/reward.htm?type=cards&merchant=citi&offer=.

* cited by examiner

AUTOMATED REWARD PROGRAM

BACKGROUND OF THE INVENTION

This invention relates to reward programs, and particularly to a automated reward program available to merchants through financial institutions.

Rewards programs are conventionally offered by merchants to customers via coupons, points programs, such as frequent flyer miles, and the like. Such a program may provide a customer an incentive to do repeat business with a merchant, thus creating customer loyalty.

Currently merchants offer discounts, such as with a coupon, or electronically, most often with a gift card or point cards with which to customers present their card to a merchant using a specific point of sale (POS) hardware and software provider that facilitates the program. Across multiple merchants, such a discount program would require establishment of a common POS infrastructure at all merchants or running separate programs inside each POS network, which is cumbersome to manage.

Some discount programs apply the discount at the time of purchase, such as by using "points", miles, or other intangible currencies to reward a customer. Such programs provide less incentive for a customer to return, if any, compared to a program that provides discounts or credits on future purchases in dollars that are more easily appreciated, understood, and used by the customer.

Available discount programs that provide "cash back" rewards are not specific to a merchant, but rather are specific to type of card, such as the Discover Card® program.

Thus, there is a need for merchant specific customer discount programs that provide rewards in dollars, allow merchants to tailor discounts offered, provide an incentive for the customer to repeat purchases, and reduce capital investment on the part of the merchant.

SUMMARY OF THE INVENTION

In various embodiments, methods are presented that are carried out by processing a purchase by a user at a merchant; submitting purchase information to a financial institution; and assigning credit to the user according to the purchase and reward program terms tailored for the merchant. The methods may further include confirming from the purchase information a reward program common to the user and merchant, and attributing the credit towards a future purchase by the user at the merchant.

In other embodiments, methods are presented that are carried out by issuing to a plurality of users a plurality of payment cards issued by one or more financial institutions; enrolling a plurality of merchants to support a plurality of reward programs for the plurality of users, each merchant setting reward program terms tailored for purchases at the merchant; submitting purchase information to the financial institutions each time a payment card is employed by one of the users to make a purchase at one of the merchants; confirming from the purchase information associated with the purchase a reward program common to the user and merchant; and assigning a plurality of credits to the plurality of users for future use at the merchant at which the credit was earned or, in another embodiment, at all or a subset of enrolled merchants, each credit assigned according to the purchase and reward program common to the user and merchant.

In still other embodiments, a system is presented that includes a financial institution that maintains merchant and user data; a merchant that sets terms of a reward program for users, and where a user makes a purchase and purchase information is processed and submitted to the financial institution; and a transaction module coupled to the financial institution. In one embodiment, the transaction module receives reward program settings and purchase information from the merchant and tracks and maintains transactions associated with the reward program. In another embodiment, the transaction module tracks and maintains transactions associated with the reward program from multiple financial institutions across multiple merchants.

DRAWINGS

FIG. 1 is a block diagram representing a system in accordance with embodiments of the present invention.

DETAILED DESCRIPTION

In the following discussion and in the claims, the terms "including" and "comprising" are used in an open-ended fashion, and thus should be interpreted to mean "including, but not limited to . . . ". The term "customer" and "user" are used interchangeably herein and may be substituted for one another throughout. Also, the term "couple" or "couples" is intended to mean either an indirect or direct electrical or communicative connection. Thus, if a first component couples to a second component, that connection may be through a direct connection, or through an indirect connection via other devices and connections. It is further noted that all functions described herein may be performed in either hardware or software, or a combination thereof, unless indicated otherwise.

In accordance with various embodiments of the present invention, FIG. 1 is a block diagram of a system 100 for providing an automated reward program. The system 100 includes a financial institution 140 that maintains data on a merchant 110 and user 120. The merchant 110 sets terms of a reward program for the user 120, also referred to as a "customer" for purposes of the present description, 120 and the user/customer 120 makes purchases at the merchant 110. Purchase information is processed and submitted to the financial institution 140 and/or the transaction module 150 from the merchant 110. In one embodiment, such information is submitted over a network 130, or across a plurality of networks (not shown), such as via the internet.

The transaction module 150 initially receives reward program settings from the merchant 110. These reward program settings may be updated from time to time at the Merchants request but are not typically transmitted with each purchase. The transaction module 150 receives purchase information from the merchant 110 when a customer 120 makes a purchase. The transaction module 150 generally tracks and maintains transactions and data associated with the reward program for purchases that are made by customers enrolled in the reward program. For example, the transaction module, possibly in conjunction with the financial institution maintaining the automated reward program, the merchant's separate financial institution (thus possibly requiring ACH instructions), the merchant, and an electronic funds transfer (EFT) provider, identifies an enrolled user and enrolled merchant from purchase information when the user makes a purchase at the merchant. Additionally, the transaction module confirms from the purchase information a reward program common to the user and merchant, and assigns a credit to the user for future use at the merchant (or, based on a plurality of purchases by a plurality of users at a plurality of merchants, assigns a plurality of credits to the plurality of users for future use at a plurality of merchants) based on the terms of the reward program. Upon a future visit to the merchant after assignment of a credit to the customer/user, the assigned credit is attributed towards the future purchase at the merchant. The assignment of credits and attribution of the credits towards future purchases may be repeated on an ongoing basis.

In some embodiments, the transaction module 150 is fully and seamlessly integrated with the databases and systems of the financial institution 140. Thus, the transaction module may be a part of the financial institution 140 or operated by a separate party in conjunction with the financial institution 140. Use of the term "transaction module" is for descriptive purposes only as used in the present application in order to indicate databases, systems, methods, hardware, and software necessary to carry out the present invention, in addition to conventional databases, systems, methods, hardware, and software employed by a financial institution or a plurality of financial institutions.

In many embodiments a payment card (not shown) issued by the financial institution 140 is employed by a customer 120 to make purchases at the merchant 110. Such a payment card may be used at any merchant. Data from the payment card is submitted with purchase information to the financial institution 140 for debiting funds from the customer's account at the financial institution. The transaction module 150 detects the purchase information and data from the card and, if the customer and merchant are both enrolled in the reward program, confirms a reward program common to the customer and merchant, and assigns the appropriate credit to the customer's account such that the credit can be applied towards future purchases at the merchant.

In various embodiments, the financial institution offers the program to merchants and customers. The merchants and customers may enroll in the program, such as, for example, by registering on a web site over the internet, over the phone, or in person at a financial institution location. The customers typically establish and/or maintain a conventional banking account at the financial institution from which payments to merchants are debited. In several embodiments, upon enrolling in the automated reward program, a customer may automatically receive notifications of reward programs offered by merchants. The program may also offer merchants the opportunity to send notices of reward programs, such as for promotional purposes, to enrolled customers. In some embodiments, upon making a purchase upon which a credit for future purchases has been created, the user may receive notifications of the credit created. Similarly, in some embodiments, upon making a purchase for which a previously earned credit will be applied and credited to the customer, the customer may receive notice that the credit has been applied.

Merchant accounts may be set up and merchant transactions may be carried out with any number of arrangements as the financial institution and merchant agree. In some embodiments, depending on the merchant's credit worthiness, a reserve account may be required by the financial institution, in addition to an operating account, in order for the merchant to participate in the automated reward program. Thus, as a non-limiting example, a credit may be pulled from a merchant's operating account to the merchant's reserve account in order to ensure the availability of the credit amount to be attributed to a customer. In another example, a merchant may be required to maintain a minimum amount, such as based on credit worthiness, historical data, standard commercial practices, and the like, in the reserve and/or operating account in order to participate in the automated reward program. Additionally, the merchant may not be required to maintain accounts at the financial institution maintaining the automated reward program as long as ACH debit permissions are granted to the maintaining financial institution.

Additionally, the transaction module will track and maintain merchant and customer transactions and data as related to the present automated reward program. Thus, whether the transaction module is integrated with the financial institution or separate, it will be coupled to the financial institution's databases and systems in order to carry out the automated reward program.

In some embodiments, the merchant and customer enroll in the automated reward program on a web site over the internet. The enrollment may include setting up accounts for the merchant and customer, if such accounts are not already established and, if such an account is already established, registering that account in the reward program. Additionally, the automated reward program permits the merchant to set the terms of the reward program. The merchant may independently, or in conjunction with the financial institution, tailor the automated reward program to the merchant's needs, such as by tying rewards to specific items, customer enrollment date, time limitations within which credits must be utilized (thereby encouraging more frequent shopping), categories of items, varying rewards per time (day, hour, month), and so on. Each merchant may set its own account with reward terms tailored to that merchant. Thus, the automated reward program permits a financial institution to provide a reward program to a plurality of merchants, where each merchant is able to set its own reward program terms per the merchant's unique needs. In some embodiments, the merchant may only offer a reward program within a limited geographical area.

By way of non-limiting example, consider a reward amount by the merchant of twenty percent (20%) of total customer purchases. A customer enrolled in the automated reward program makes a one hundred dollar ($100) purchase at the merchant with the payment card issued by the financial institution. The 20% reward on the $100 purchase accrues twenty dollars ($20) to the customer. This occurs by the transaction module identifying the customer, merchant, and dollar amounts from the purchase information posted by the merchant. In some embodiments, this requires the transaction model to access the databases of both the financial institution and an electronic funds transfer (EFT) provider. The transaction module identifies the merchant as providing a reward program, identifies the customer as enrolled in the merchant's reward program, identifies the terms of the reward program, and applies the terms to the customer's purchase, thus in this case assigning $20 as credit to the customer that can be applied towards future purchases at the merchant.

The customer may be notified, such as automatically via e-mail, of the $20 credit awarded to the customer because of the purchase. In some embodiments, the customer may not yet be enrolled in the merchant's reward program and may receive a communication that provides notice of the availability of the credit, and further explanation of the reward program, if the customer will enroll.

The next time the customer makes a $50 purchase at the same merchant. Assuming the customer is already enrolled in the program, the $20 credit, or some other amount determined by the merchant, earned from the previous purchase will be applied towards the $50 purchase so that the cost of the $50 purchase after the credit is only thirty dollars ($30). The merchant may, in the merchant's discretion, elect to designate that the amount earned from the previous purchase to be applied toward the $50 purchase be capped at some maximum dollar amount or at some percentage of the value of the $50 purchase. In some embodiments, initially, upon the merchant posting the purchase information, the full $50 purchase may be shown as debited from the customer's account at the financial institution. Then, for example at a predetermined time each night the day after a purchase is made, the transaction module may apply the $20 credit to the customer's account so that the $50 debit is reduced by the credit amount. Thus for a merchant providing a plurality of rewards to a plurality of customers on the same day, the financial institution and transaction module may carry out debiting and crediting of the customers' accounts at the same time, thus coordinating reconciliation of the merchants' and customers' accounts.

As before when credit was assigned to the customer, the customer may receive another communication indicating application of the $20 credit to the subsequent purchase to reduce the amount debited from $50 to $30. Additionally, the $50 purchase may cause assignment of another credit to the customer from the merchant based on the 50, which at 20% is ten dollars ($10). Alternatively, the merchant may set the terms of the reward program such that the reward amount for the subsequent purchase is based on the discounted amount, which in this case would be the $30, thus resulting in assignment of credit for the $50 purchase of $50−$20=$30; and $30 times 20% is six dollars ($6). Thus, if the reward amount for the subsequent purchase is based on the discounted amount, the next available amount to be credited towards the next subsequent purchase by the customer at the merchant is $6. Of course, as previously discussed, the amount could be capped—either as a dollar amount or as a percentage of the $50 sale. The method including assigning credit for a purchase and attributing the credit towards a subsequent purchase may be repeated as desired by the merchant to provide rewards for customer purchases.

The merchant may further vary the terms such as by limiting the discount to only apply to the initial purchase, only to purchases that exceed some minimum amount, and so on. The merchant and financial institution can tailor and subsequently modify the reward program to meet the merchant's needs. In yet another variation, a merchant might provide reward programs that are tailored for different types of customers.

Table 1 and Table 2 provide a hypothetical example of a notification to a customer in accordance with embodiments of the present invention:

TABLE 1

| Merchant | Earned Roll Forward Credit | Credit Expires IN | Merchant Site |
|---|---|---|---|
| Kraji Czech Gourmet | $33.12 | 2 Days | czechtogo.com/rollforward |
| Otis's Bar and Grill | $2.34 | 24 Days | otisbg.com |

TABLE 2

| Merchant | Roll Forward Opportunity | Valid Through | Merchant Site |
|---|---|---|---|
| Jakes's Mexican Restaurant | 20% | Tuesday, May 16, 2006 | jakes.com/rollforward |
| Linda Tires | 10% | Sunday, Jun. 11, 2006 | lindatires.com |
| Kraji Czech Gourmet | 50% | Saturday, May 13, 2006 | czechtogo.com/rollforward |
| Otis's Bar and Grill | 33% | Monday, May 14, 2006 | otisbg.com |

This sample notification includes information on credits already assigned to the customer because of purchases made in the past (Table 1) and information on additional rewards available to the customer if the customer desires to shop at the listed merchants in the future (Table 2). Table 1 indicates the dollar credit amounts accumulated at the two merchants and the time limitations set by the merchants within which the credits must be realized. Table 2 indicates additional rewards available if future purchases are made at the two merchants listed in Table1, plus two additional merchants. The merchants set the terms associated with the reward, in this case the credit amount available to the customer and a time frame within which purchases must be made in order for the credit to be assigned.

In at least some embodiments, the customer does not need to present a version of the above rewards to the merchant or financial institution in print as the purchases, debits, credits, and so on all occur electronically, including the customer notifications, such as via e-mail. So the customer is able to monitor available rewards and credits to the customer's account(s) without, for example, locating and presenting coupons, or browsing catalogs.

Any number of variations of reward programs is possible with the automated reward program of the present invention. Thus, the automated reward program of the present invention enables the financial institution to offer, hypothetically, a thousand different award programs tailored for a thousand different merchants. A customer in possession of a payment card issued by the financial institution in accordance with embodiments of the present invention may make purchases at, for example, one hundred different merchants that are enrolled in the automated reward program at the financial institution, each merchant having its own tailored reward program set for the customer, and the customer may receive one hundred different types of discounts from the one hundred different merchants. All of these benefits are available without the need for point of sale (POS) hardware and/or software.

It is contemplated that the merchant reward registration and subsequent transaction information will be transmitted through an application service provider model. The participating financial institutions will likely be indifferent to the identity of the merchants provided the merchants are providing an acceptable level of quality of goods and services to the users. Once they have been authorized to participate in the merchant reward program, they would simply be connected to the network through a hardware or software connection. It is possible that the administrator of the network would then have the ability to view or monitor all transactions conducted through the network. The financial institution would be able to work with the administrator to recruit users from the financial institution's customer base, and perhaps also recruit additional merchants.

Although exemplary embodiments of the invention have been disclosed, it will be apparent to those skilled in the art that various changes and modifications can be made which will achieve some of the advantages of the invention without departing from the spirit and scope of the invention. For example, it will be obvious to those reasonably skilled in the art that, although the description was primarily directed to a particular hardware system and operating system, other hardware and operating systems could be used in the same manner as that described. Other aspects, such as the specific instructions utilized to achieve a particular function, as well as other modifications to the inventive concept are intended to be covered by the appended claims.

What is claimed is:

1. A method of operating an automated reward program through a financial institution over a network comprising:

enrolling a merchant into a financial institution's rewards program wherein the terms of the reward program for the enrolled merchant are tailored for said merchant;

receiving information at the financial institution about a first purchase by a user at a merchant wherein the user has a banking account at the financial institution which is associated with the financial institution's reward program;

determining if the user's first purchase was at a merchant enrolled in the financial institution's reward program and if the user qualified for such enrolled merchant's reward program;

assigning reward credit to the user's account in connection with such first purchase according to the purchase and reward program terms tailored for the enrolled merchant wherein the assigning of the reward credit is in monetary units and the assigned reward credit may be applied towards a future purchase by the user at the enrolled merchant;

receiving information at the financial institution about a second purchase by the user at the enrolled merchant;

determining if the second purchase was at the enrolled merchant and if the user is still qualified for such enrolled merchant's reward program; and determining if at least a portion of any previously assigned credit may be applied toward the payment of the second purchase.

2. The method of claim 1, further comprising:

assigning, responsive to the second purchase, a second reward credit for the account holder for future purchases at the enrolled merchant;

debiting the banking account of the account holder for an amount equal to the second purchase price; and applying at least a portion of any unexpired previously assigned reward credit toward the payment of the second purchase.

3. The method of claim 2 wherein the tailored terms of the reward program for the enrolled merchant comprises:

imposing a cap on the amount of the previously assigned reward credit that may be applied toward a future purchase at the enrolled merchant.

4. The method of claim 2 wherein the financial institution maintains records relating to the assigning and attributing of the reward credits, and the tailored terms of the reward program for the enrolled merchant comprises imposing a limitation on the time period in which a reward credit may be applied toward a future purchase at the enrolled merchant and wherein the method further comprises:

in response to receiving information about a second purchase, determining if the second purchase was made within the time period in which the previously assigned reward credit may be applied to a future purchase at the enrolled merchant; and in response to determining that the second purchase was made within the time period, applying at least a portion of the unexpired previously assigned reward credit toward the payment of the second purchase.

5. The method of claim 2 further comprising repeating the assigning and attributing of reward credits for additional purchases by the user at the enrolled merchant.

6. The method of claim 1, further comprising paying for the purchase at the merchant with a payment card issued by the financial institution to the user that is associated with the banking account of the user at the financial institution wherein the information from the payment card is used to identify that the user is enrolled in the reward program associated with the enrolled merchant.

7. The method of claim 1 wherein the reward credit is assigned in dollars.

8. The method of claim 1 further comprising enrolling a plurality of merchants to support a plurality of reward programs for users that have a banking account at the financial institution which is associated with at least one of the financial institution's plurality of rewards programs, each merchant setting its own reward program terms.

9. The method of claim 1 wherein the user is provided notice of the status of the reward program, the reward credits earned by and assigned to the user, and the amount of the credit attributed to purchases at the enrolled merchant.

10. A method of operating an automated reward program through a financial institution over a network comprising:

issuing to each of a plurality of users a payment card which is associated with that user's banking account at the financial institution;

enrolling a plurality of merchants to support a plurality of reward programs for the plurality of users, each enrolled merchant setting reward program terms for its reward program that are tailored for purchases at the enrolled merchant;

receiving purchase information at the financial institution each time a payment card is employed by one of the plurality of users to make a purchase at one of the enrolled merchants;

confirming from the purchase information associated with a purchase a reward program that is common to the user and enrolled merchant; and assigning a plurality of reward credits to the plurality of users for future use at the plurality of enrolled merchants, wherein each reward credit is assigned in monetary units according to the purchase and reward program common to the user and enrolled merchant; and debiting the banking account of the user associated with the payment card used to make the purchase for an amount equal to the purchase price of the purchase at the enrolled merchant;

crediting the bank account of the user with at least a portion of the unexpired reward credits of the user in the reward program associated with the enrolled merchant.

11. The method of claim 10 further comprising attributing a plurality of reward credits towards a plurality of future purchases by the plurality of users at the plurality of enrolled merchants, each reward credit attributed according to the credit assigned to each user for future use at each respective enrolled merchant.

12. The method of claim 11 further comprising repeating the assigning and attributing for additional purchases by each of the plurality of users at each respective merchant of the plurality of enrolled merchants.

13. The method of claim 11 wherein the financial institution maintains records of the assigning and attributing of the reward credits of each of the plurality of users to each of the plurality of reward programs associated with the plurality of enrolled merchants, wherein the tailored terms of each of the plurality of reward programs for each of the plurality of enrolled merchant comprises imposing a limitation on the time period in which a reward credit can be applied toward a future purchases at the enrolled merchant and wherein the method further comprises:

in response to receiving information about another purchase by a user in a reward program associated with an enrolled user, determining if the purchase was made within the time limitation in which an unexpired previously assigned reward credit associated with that enrolled merchant's reward program may be applied to a future purchase at the enrolled merchant; and in response to determining that the second purchase was made within the required time period, applying at least a portion of the unexpired previously assigned reward credits of the user toward the payment of the second purchase at the enrolled merchant.

14. A system for operating a reward program through a financial institution over a network wherein each of a plurality of merchants has enrolled into a financial institution's rewards program having terms tailored for each respective enrolled merchant and wherein each of a plurality of users having banking accounts at the financial institution has enrolled in the financial institution's reward program, the system comprising:

a financial institution that receives and stores data about each of the enrolled merchants and each of the users' accounts associated with the reward program; and a transaction module coupled to the financial institution for managing enrollment in and processing of purchase transactions associated with the reward program, the transaction module comprising:

a memory unit operable for storing a computer program for operating the reward program; and a processor coupled to said memory unit, wherein said processor, responsive to said reward computer program, is programmed for:

determining if a first purchase made by a user was made at one of the respective enrolled merchants;

determining if the user qualifies for a reward credit that may be applied toward a future purchase by the user at the enrolled merchant; and assigning a first reward credit in monetary units to the user's reward credit account if the user's banking account qualifies for a reward credit;

determining if a second purchase made by the user with the first assigned credit was made at the enrolled merchant at which the first assigned credit may by applied; and applying at least a portion of the first assigned credit to the second purchase;

wherein the financial institution credits an assigned reward credit and debits an applied reward credit in monetary units to the user's banking account in response to instructions from the transaction module.

15. The system of claim 14 further comprising a payment card issued by the financial institution to a user and employed by the user to make purchases at an enrolled merchant; wherein data from the payment card received with the purchase information at the financial institution over the network and the transaction module confirms a reward program common to the user and enrolled merchant and assigns a reward credit to the user to be applied towards future purchases at the enrolled merchant.

16. The system of claim 14 wherein a user comprises a plurality of users wherein each merchant sets the terms of its own reward program such that a credit assigned to a user for a purchase at the merchant is attributed to the user's future purchase at that merchant.

17. The system of claim 16 wherein the transaction module is integrated with the financial institution.

18. The system of claim 16 wherein the plurality of enrolled merchants do not need common point of sale (POS) hardware and software to participate in the plurality of reward programs operated through the financial institution.

19. A method of operating an automated reward program through a financial institution over a network comprising the steps of:

receiving, by a transaction module for the financial institution, a merchant enrollment for participation by the merchant in a merchant reward program of the financial institution wherein the terms of the reward program for such enrolled merchant are tailored for such enrolled merchant;

receiving, by the transaction module, an enrollment of a banking account holder of the financial institution for participation by the account holder in the merchant reward program of the financial institution;

receiving notice by the transaction module for the financial institution of a first purchase of the account holder at the enrolled merchants, wherein for the first purchase the account holder presented information authorizing payment from the banking account of the account holder at the financial institution;

debiting the banking account of the account holder at the financial institution for the first purchase;

the transaction module assigning, responsive to the first purchase, a first monetary credit for the account holder for future purchases at the enrolled merchant;

debiting an account of the enrolled merchant, responsive to the first purchase, of an amount corresponding to the first monetary credit;

receiving notice by the transaction module for the financial institution of a second purchase by the account holder at the enrolled merchant, wherein for the second purchase the account holder presented information authorizing payment from the banking account of the account holder;

the transaction module assigning, responsive to the second purchase, a second monetary credit for the account holder for future purchases at the enrolled merchant;

debiting the banking account of the account holder for the second purchase; and applying at least part of the first monetary credit assigned to the account holder to the payment of such second purchase.

* * * * *